(No Model.)
D. M. SMALL.
GAS BURNER GAGE.
No. 266,541. Patented Oct. 24, 1882.
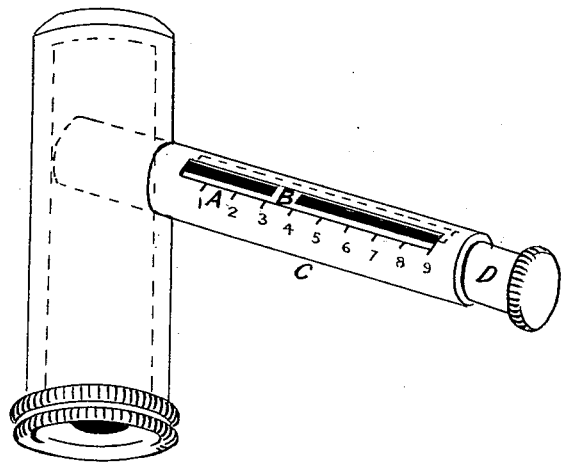
WITNESSES.
Joseph H. Perkins
John S. Whitehouse.
INVENTOR
Dexter M. Small,

UNITED STATES PATENT OFFICE.

DEXTER M. SMALL, OF PROVIDENCE, RHODE ISLAND.

GAS-BURNER GAGE.

SPECIFICATION forming part of Letters Patent No. 266,541, dated October 24, 1882.

Application filed July 9, 1881. (No model.)

*To all whom it may concern:*

Be it known that I, DEXTER M. SMALL, of Providence, in the State of Rhode Island, have invented a new and useful Improvement in Gas-Burner Gages or Meters, my object being to adapt to different kinds or densities of gas the same scale which would otherwise require to be varied in accordance with the density.

The accompanying drawing, which forms a part of this specification, gives a general view of one of the gages or meters to which my improvement applies, and to which it is attached for illustration.

The gage or meter represented in the drawing shows the size of the burner by measuring with the scale A, made for the purpose, (the marks thereon indicating feet or parts of feet,) the blaze or flame produced by the gas from the burner passing freely through the instrument and out of the slot B, the length of flame, as stated, indicating the rate of passage of the gas, and consequently the size of the burner from which the gas flows. Now I have ascertained that the scale A made for measuring one density of gas will not correctly measure any other. Thus when one foot of gas per hour of a given density is passing through the instrument and out of the slot B the blaze or flame will extend to the first mark on the scale, whereas if of a greater density it will extend farther, and if of a less density it will not extend so far. To overcome this difficulty without being obliged to make a separate scale for different densities or a schedule showing the variation, I simply make the slot B adjustable in width, so that it can be varied to correspond with the density of gas used. Of course, if the scale is made for any given density and a greater density be used with it, the slot should be widened a little, and vice versa for gas of a less density. This adjustment can be made in various ways; but the one represented in the drawing is simple and answers the purpose of illustrating the nature of the device. Within the tube C, I insert so as to fit closely a second tube, D, with a slot cut in it to correspond with the one in the tube C, leaving this second tube extending out a half-inch or so to take hold of for the purpose of turning it within the tube C, thus varying the width of the slot at pleasure. The drawing represents the tube D turned a little, thus partly closing the slot B. A second slot could be made in the tube C and be made adjustable, so as to answer this purpose; but it would not be as desirable.

The foregoing device for adapting one scale to different densities of gas can be applied to any meter or gage for testing gas-burners by means of a graduated slot, whether the gas be lighted thereat or any other device be used in connection therewith, as in my meter patented August 28, 1877, or any similar device.

I claim as my invention—

In a gas-test gage of the class described, in connection with a graduated scale, a longitudinally-slotted tube having a device whereby the width of the slot may be regulated, substantially as and for the purpose set forth.

DEXTER M. SMALL.

Witnesses:
JOSEPH H. PERKINS,
JOHN S. WHITEHOUSE.